United States Patent
Vedhagiri et al.

(10) Patent No.: US 7,914,253 B2
(45) Date of Patent: Mar. 29, 2011

(54) SYSTEM FOR REGULATING A COOLING FLUID WITHIN A TURBOMACHINE

(75) Inventors: Sivaraman Vedhagiri, Greer, SC (US);
Ravi Meenaksh, Greenville, SC (US);
Jesse Trout, Simpsonville, SC (US);
William Parker, Simpsonville, SC (US);
Eric Scicchitano, Montreal (CA);
Joseph Moroso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1001 days.

(21) Appl. No.: 11/799,162

(22) Filed: May 1, 2007

(65) Prior Publication Data

US 2008/0273968 A1    Nov. 6, 2008

(51) Int. Cl.
*F01D 25/12* (2006.01)
*F01D 11/02* (2006.01)

(52) U.S. Cl. .................... 415/115; 415/230

(58) Field of Classification Search ............ 415/115, 415/116, 174.5, 180, 230
See application file for complete search history.

(56) References Cited

U.S. PATENT DOCUMENTS

| | | | | | |
|---|---|---|---|---|---|
| 2,401,826 | A | * | 6/1946 | Halford | 416/97 R |
| 3,832,090 | A | * | 8/1974 | Matto | 416/95 |
| 4,551,062 | A | * | 11/1985 | Geary | 415/115 |
| 5,961,279 | A | * | 10/1999 | Ingistov | 415/170.1 |
| 6,767,182 | B2 | * | 7/2004 | Coppola | 415/115 |
| 6,769,870 | B2 | * | 8/2004 | De Meo | 415/199.5 |
| 7,534,087 | B2 | * | 5/2009 | Minninger | 416/97 R |

* cited by examiner

*Primary Examiner* — Nathaniel Wiehe
(74) *Attorney, Agent, or Firm* — Dale J. Davis; Ernest G. Cusick; Frank A. Landgraff

(57) ABSTRACT

A system for regulating a cooling fluid within a turbomachine. The system may include a plurality of bypass chambers, wherein each of the plurality of bypass chambers allows for the cooling fluid to pass from the compressor section to the at least one wheelspace area. The system may also include a plurality of bypass plugs, wherein each of the plurality of bypass plugs is insertable into a bypass chamber opening on each of the plurality of bypass chambers.

16 Claims, 4 Drawing Sheets

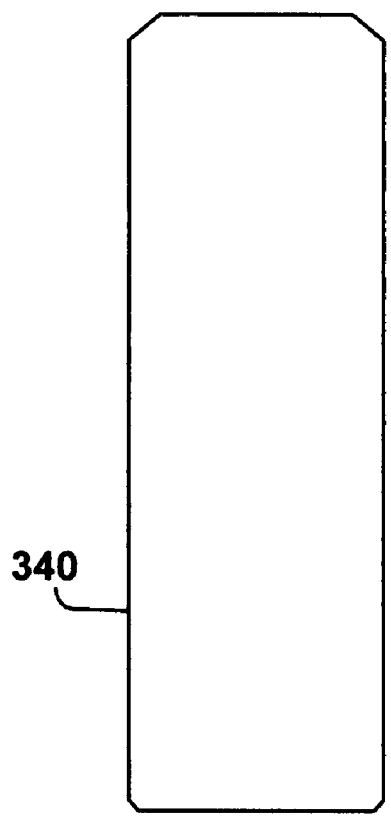
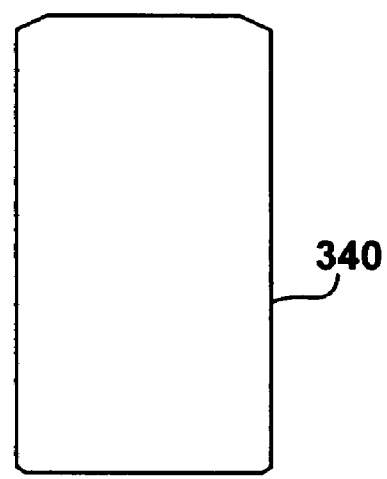
Fig. 4
Fig. 5

SYSTEM FOR REGULATING A COOLING FLUID WITHIN A TURBOMACHINE

BACKGROUND OF THE INVENTION

The present application relates generally to a cooling system on a turbomachine; and more particularly to, a system for regulating a cooling fluid within a turbomachine.

In some turbomachines, such as gas turbines, a portion of the air compressed by the compressor is typically diverted from combustion to cool various stationary and rotating components or to purge cavities within a gas turbine. The diverted airflow (hereinafter "cooling fluid", or the like) consumes a considerable amount of the total airflow compressed by the compressor. The diverted cooling fluid is not combusted, and thus reduces the performance of the gas turbine. Regulating and controlling the cooling fluid can dramatically increase the performance of the turbine.

Typically, the cooling fluid is extracted from the compressor, bypasses the combustion system, and flows through a cooling circuit. The cooling circuit may run adjacent various turbine components including the rotor compressor-turbine joint (hereinafter "marriage joint"), and various wheelspace areas. The cooling circuit is typically integrated with a seal system. Relatively tight clearances may exist between the seal system components and the gas turbine rotor.

The seal system may include labyrinth seals between rotation and stationary components. The typical leakages that may occur through the labyrinth seal clearances are commonly used for cooling or purging areas downstream of the seals. For example, a high-pressure packing seal system (HPPS) may include a labyrinth and brush seal arrangement, wherein the leakage flow past the HPPS cools the downstream components including the wheelspace areas. The effectiveness of the cooling circuit is highly dependent on the performance of the HPPS.

The configuration of the cooling circuit determines whether or not adequate cooling fluid flows to the aforementioned turbine components. The cooling circuit may include a chamber that directs the cooling fluid flow to a specific wheelspace area.

There are a few possible problems with the currently known seal systems. Wear may enlarge the seal system clearances. Seals may wear from a "trip" (an emergency shutdown of the turbomachine). Seals may also wear over time from gas turbine operation. Wearing allows excessive cooling fluid to flow downstream of the seals; reducing the overall efficiency of the gas turbine. The unpredictable nature of the seal system wear occurrence does not allow for a deterministic flow of the cooling fluid through the cooling circuit. Furthermore, the currently known seal systems do not allow for regulating the amount of cooling fluid flowing into the wheelspace areas, in order to compensate for seal system wear. Therefore, the currently known seal systems do not provide a way to increase or decrease the amount of cooling fluid flowing to the wheelspace areas.

For the foregoing reasons, there is a need for a system that allows for regulating the cooling fluid passing into at least one wheelspace area of a gas turbine. The system should ensure adequate cooling while improving the efficiency of the gas turbine. The system should also provide for a deterministic flow through the cooling circuit.

BRIEF DESCRIPTION OF THE INVENTION

In accordance with an embodiment of the present invention, a system for regulating a cooling fluid within a turbomachine, the turbomachine comprising a compressor section and at least one wheelspace area, the system comprising a plurality of bypass chambers, wherein each of the plurality of bypass chambers allows for the cooling fluid to pass from the compressor section to the at least one wheelspace area; and wherein each of the plurality of bypass chambers comprises a bypass chamber opening near the at least one wheelspace area.

The system also comprises a plurality of bypass plugs, wherein each of the plurality of bypass plugs is insertable into the bypass chamber opening on each of the plurality of bypass chambers; and wherein each of the plurality of the bypass plugs is adapted to prevent the cooling fluid from entering the at least one wheelspace area when each of the plurality of bypass plugs is inserted into each bypass chamber opening.

In accordance with an alternate embodiment of the present invention, a system for regulating a cooling fluid within a turbomachine, the turbomachine comprising a compressor section, and at least one wheelspace area, the system comprising a plurality of bypass chambers, wherein each of the plurality of bypass chambers allows for the cooling fluid to pass from the compressor section to the at least one wheelspace area; wherein each of the plurality of bypass chambers comprises a bypass chamber opening near the at least one wheelspace area; wherein each of the plurality of bypass chambers comprises a bypass chamber opening near the at least one wheelspace area; and wherein each of the plurality of bypass chambers further comprises a bypass angular section, wherein the bypass angular section directs the cooling fluid in a manner for pre-swirling the cooling fluid.

The system also comprises a plurality of bypass plugs, wherein each of the plurality of bypass plugs is insertable into the bypass chamber opening on each of the plurality of bypass chambers; and wherein each of the plurality of the bypass plugs is adapted to prevent the cooling fluid from entering the at least one wheelspace area when each of the plurality of bypass plugs is inserted into each bypass chamber opening.

In accordance with an alternate embodiment of the present invention, a system integrated with a seal system for regulating a cooling fluid within a turbomachine, the turbomachine comprising a compressor section, and at least one wheelspace area, the system comprising: a plurality of bypass chambers, wherein each of the plurality of bypass chambers allows for the cooling fluid to pass from the compressor section to the at least one wheelspace area; wherein each of the plurality of bypass chambers comprises a bypass chamber opening near the at least one wheelspace area; and wherein each of the plurality of bypass chambers further comprises a bypass angular section, wherein the bypass angular section directs the cooling fluid in a manner for pre-swirling the cooling fluid.

The system also comprises a plurality of bypass plugs, wherein each of the plurality of bypass plugs is insertable into the bypass chamber opening on each of the plurality of bypass chambers; and wherein each of the plurality of the bypass plugs is adapted to block the cooling fluid from entering the at least one wheelspace area when each of the plurality of bypass plugs is inserted into each bypass chamber opening.

BRIEF DESCRIPTION OF THE DRAWING

FIG. 3, illustrate schematic views of a bypass system in accordance with an embodiment of the present invention.

FIG. 4 is a schematic view, illustrating a bypass plug in accordance with an embodiment of the present invention.

FIG. 5 is a schematic view, illustrating a bypass plug in accordance with an alternate embodiment of the present invention.

DETAILED DESCRIPTION OF THE INVENTION

Certain terminology is used herein for convenience only and is not to be taken as a limitation on the invention. For example, words such as "upper," "lower," "left," "front", "right," "horizontal," "vertical," "upstream," "downstream," "fore", and "aft" merely describe the configuration shown in the Figures. Indeed, the components may be oriented in any direction and the terminology, therefore, should be understood as encompassing such variations unless specified otherwise.

Figure 1:
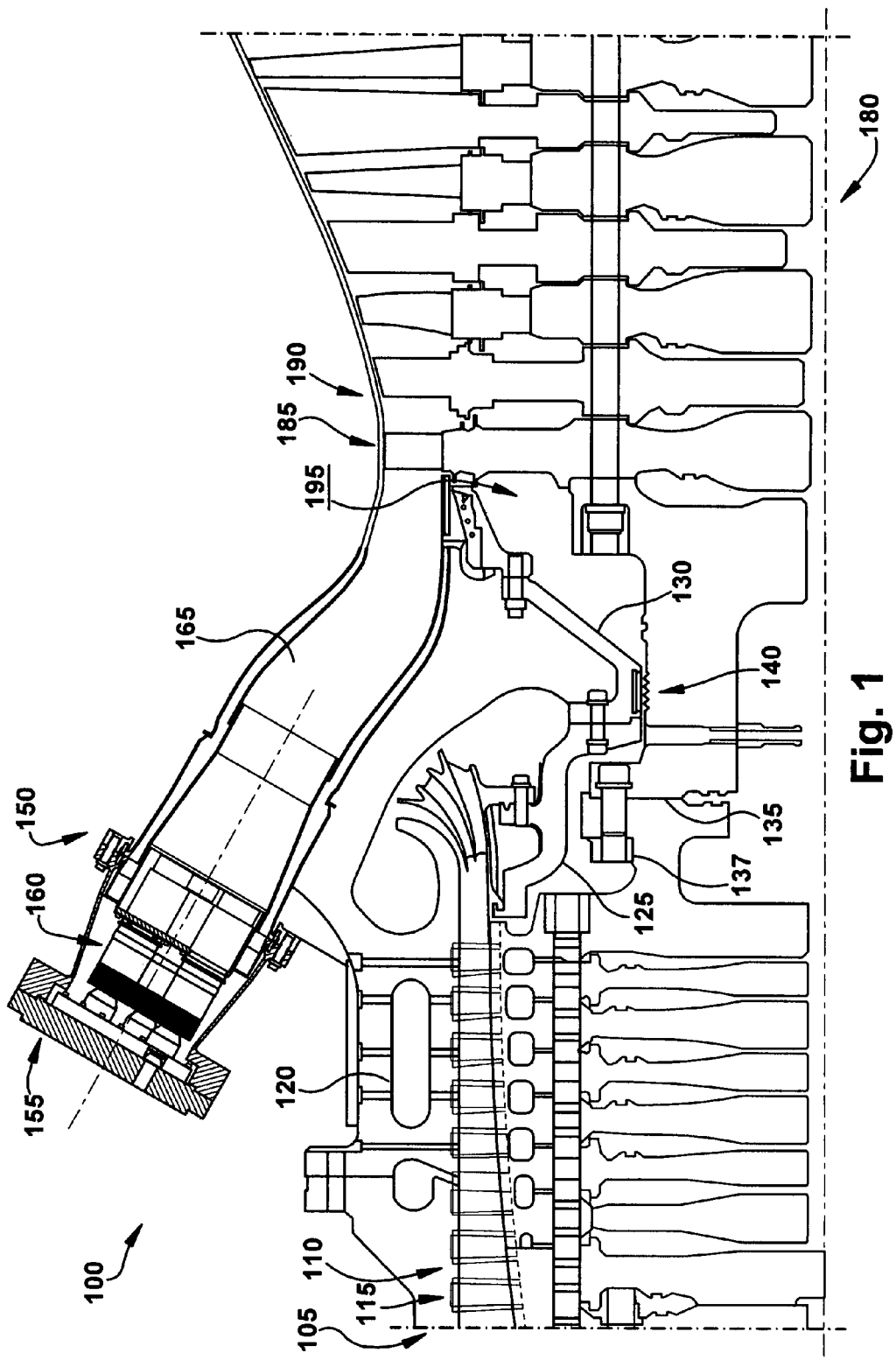
FIG. 1 is a schematic view, in cross-section, of a gas turbine, illustrating the environment in which an embodiment of the present invention operates.

Referring now to the Figures, where the various numbers represent like components throughout the several views, FIG. 1 is a schematic view, in cross-section, of a portion of a gas turbine, illustrating the environment in which an embodiment of the present invention operates. In FIG. 1, a gas turbine 100 includes: a compressor section 105; a combustion section 150; and a turbine section 180.

Generally, the compressor section 105 includes a plurality of rotating blades 110 and stationary vanes 115 structured to compress a fluid. The compressor section 105 may also include at least one extraction port 120, an inner barrel 125, a compressor discharge casing 130, a marriage joint 135, and a marriage joint bolt 137.

Generally, the combustion section 150 includes a plurality of combustion cans 155 (only one is illustrated), a plurality of fuel nozzles 160, and a plurality of transition sections 165 (only one is illustrated). The plurality of combustion cans 155 may be coupled to a fuel source (not illustrated). Within each combustion can 155, compressed air is received from the compressor section 105 and mixed with fuel received from the fuel source. The air and fuel mixture is ignited and creates a working fluid. The working fluid generally proceeds from the aft end of the plurality of fuel nozzles 160 downstream through the transition section 165 into the turbine section 180.

Generally, the turbine section 180 includes a plurality of rotating components 185, a plurality of stationary components 190, and a plurality of wheelspace areas 195. Generally, the turbine section 180 converts the working fluid to a mechanical torque.

Typically, during the operation of the gas turbine 100, a plurality of components experience high temperatures and may require cooling or purging. These components may include a portion of the compressor section 105, the marriage joint 135, and the plurality of wheelspace areas 195.

The extraction port 120 draws cooling fluid from the compressor section 105. The cooling fluid bypasses the combustion section 150, and flows through a cooling circuit 200 (illustrated in FIG. 2), for cooling or purging various components, including the marriage joint 135, and at least one of the plurality of wheelspace areas 195.

Figure 2:
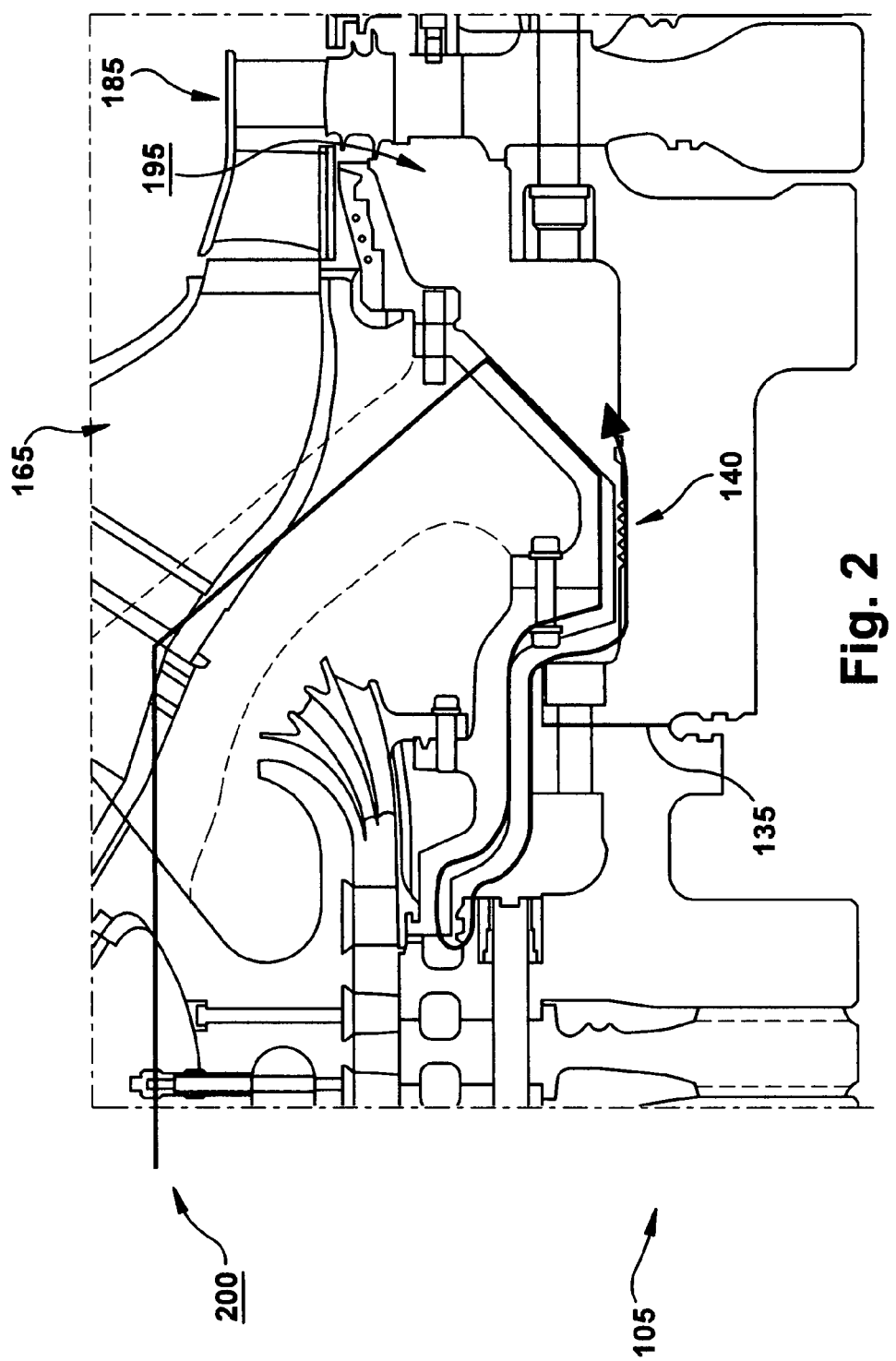
FIG. 2 is an enlarged view of a portion of the gas turbine illustrated in FIG. 1.

Referring now to FIG. 2, which is a close-up view of the gas turbine illustrated in FIG. 1. FIG. 2 illustrates an example, but not limiting of, an embodiment of the present invention comprising the cooling circuit 200. The flow path of the cooling circuit 200 may start at the extraction port 120 (illustrated in FIG. 1), flow through a portion of the compressor discharge casing 130 and the inner barrel casing 125, through to a cavity at the aft end of the compressor section 105. Next, the cooling circuit 200 may reverse direction, flowing past the marriage joint 135, past the seal system components 140, to the wheelspace area 195.

Figure 3A:
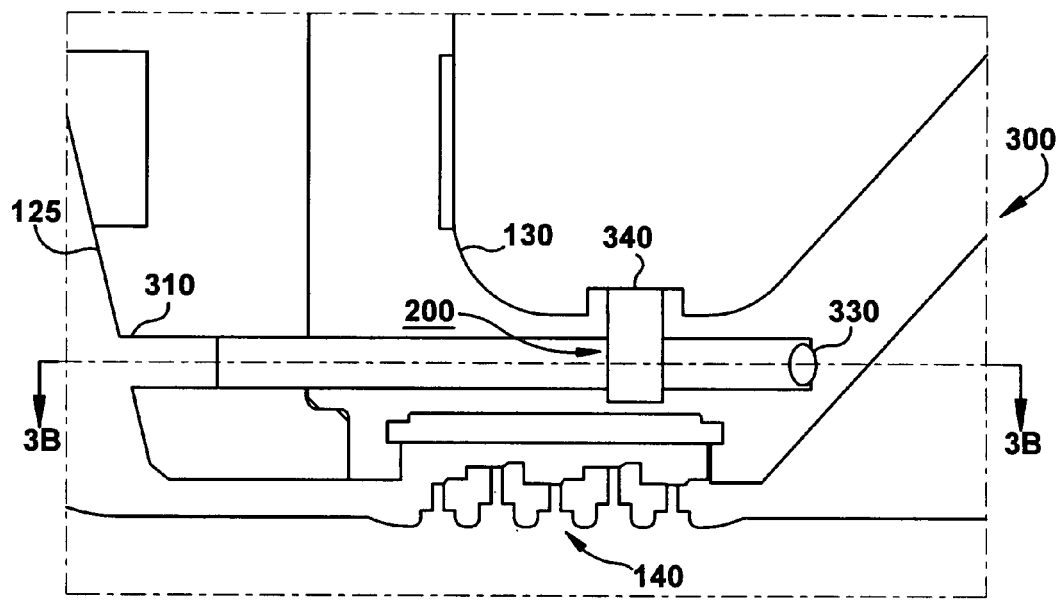
FIGS. 3A and 3B, collectively
Figure 3B:
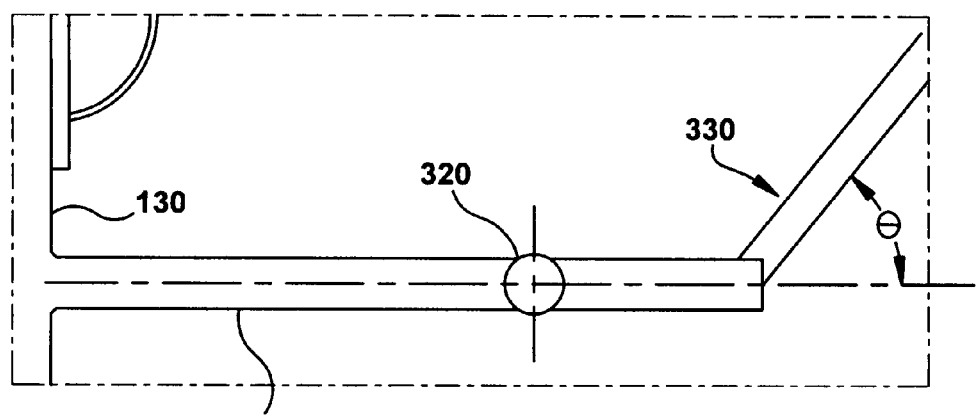

Referring now to FIGS. 3A and 3B, collectively FIG. 3, which illustrate schematic views of a bypass system 300 in accordance with an embodiment of the present invention. FIG. 3A illustrates the bypass system 300, which may include a plurality of bypass chambers 310, wherein each of plurality of bypass chambers 310 may include at least one bypass chamber opening 320, and at least one bypass angular section 330. The bypass system 300 may also include a plurality of bypass plugs 340.

Each of the plurality of bypass chambers 310 may extend through a portion of the inner barrel casing 125 and the compressor discharge casing 130. Each of the plurality of the bypass chambers 310 may integrate with the cooling circuit 200; thereby allowing for a cooling fluid to flow within the bypass chamber 310. Each of the plurality of bypass chambers 310 may be of any shape that allows for the desired cooling flow characteristics. Furthermore, each of the plurality of bypass chambers 310 may comprise any shape allowing for a cost effective forming method of the bypass chamber 310 within the gas-turbine 100.

In an embodiment of the present invention, a portion of the plurality of bypass chambers 310 may be located on the upper half of the inner barrel casing 125 and compressor discharge casing 130; and a portion of the plurality of bypass chambers 310 may be located on the lower half of the inner barrel casing 125 and compressor discharge casing 130.

Each of the plurality of bypass chambers 310 may include at least one bypass chamber opening 320. In an embodiment of the present invention, the bypass chamber opening 320 may be located within the compressor discharge casing 130 adjacent a region allowing for easy access to the bypass chamber opening 320 and the bypass chamber 310. As illustrated in FIG. 3A, the bypass chamber opening 320 may fully extend through the bypass chamber 310. In an alternate embodiment of the present invention, the bypass chamber opening 320 may partially extend into the bypass chamber 310.

The bypass chamber opening 320 may comprise any shape that allows for the bypass chamber opening 320 to extend into the bypass chamber 310. For example, but not limiting of, an embodiment of the present invention may comprise a bypass chamber opening 320 having a cylindrical shape, as illustrated in FIGS. 3A and 3B. The bypass chamber opening 320 may comprise a width or a diameter that allows for the insertion of a bypass plug 340 (described below), as illustrated in FIG. 3A. A surface (not illustrated) within the bypass chamber opening 320 may allow for mating with a corresponding surface (not illustrated) on the bypass plug 340. For example, but not limiting of, the surface (not illustrated) within the bypass chamber opening 320 may include a threaded portion, which mates with a corresponding threaded portion (not illustrated) on the bypass plug 340.

The bypass chamber 310 may also include at least one bypass angular section 330. The bypass angular section may be located relatively downstream of the bypass chamber opening 320. The bypass angular section 330 may comprise the portion of the bypass chamber 310 adjacent the at least one of the plurality of wheelspace areas 195 (as illustrated for in FIGS. 1 and 2).

Referring now to FIG. 3B, which illustrates a sectional view of the bypass system 300 along line A-A. The bypass angular section 330 may include an angle θ measured relative to the axis of rotation of the gas turbine rotor (not illustrated).

The bypass angular section 330 may alter the flow path of the cooling circuit 200 to create a pre-swirl of the cooling fluid possibly entering the at least one of the plurality of wheel-space areas 195. The magnitude of the angle θ may be configured to increase the efficiency of the gas turbine 100.

Referring again to FIG. 3A, the bypass system 300 may also include a plurality of bypass plugs 340, wherein each of the plurality of bypass chambers 310 may include at one bypass plug 340. As discussed, the plurality of bypass plugs 340 may comprise of a thickness or a diameter allowing for insertion into each bypass chamber opening 320. For example, but not limiting of, in an embodiment of the present invention, the bypass chamber opening 320 comprises a cylindrical shape, and the corresponding bypass plug 340 similarly comprises a cylindrical shape allowing for insertion into the bypass chamber opening 320. The plurality of the bypass plugs 340 may be formed of a similar material to the compressor discharge casing 130, or any other material capable of withstanding the operating environment to which the plurality of bypass plugs 340 may be exposed.

The bypass system 300 may be integrated with a turbine seal system, such as a high-pressure packing system (HPPS). As illustrated in FIG. 3A, the HPPS may include seal system components 140. The seal system components 140, may include for example, but not limiting of, a high pressure brush seal/honey comb seal arrangement, or the like.

In use, the bypass system 300 may receive cooling fluid from the cooling circuit 200. When a bypass plug 340 is fully inserted into the bypass chamber opening 320, the cooling fluid may be restricted from flowing into the bypass angular section 330. However, when a bypass plug 340 is partially inserted into, or removed from, the bypass chamber opening 320, a portion of the cooling fluid flows through the bypass chamber 310 to the bypass angular section 330 and may be pre-swirled before flowing to the wheelspace areas 195.

Furthermore, an embodiment of the present invention allows the user the flexibility of determining which of the plurality of bypass plugs 340 may be fully inserted, partially inserted, or completely removed, from each of the plurality of bypass chamber openings 320. The aforementioned features may allow a user to maximize the performance and efficiency of the gas turbine 100 by compensating for the potential varying wear rates of the seal system components 140. The bypass system 300 thus allows a user to plug or unplugged each, some, or all of the bypass chamber openings 320, to allow the appropriate amount of cooling fluid to flow to each of the plurality of wheelspace areas 195. The aforementioned features may provide for a near deterministic flow through the cooling circuit 200.

Referring now to FIG. 4, which is a schematic view, illustrating a bypass plug 340 in accordance with an embodiment of the present invention. As discussed, the bypass plug 340 may be formed of a similar material to the compressor discharge casing 130, or any other material capable of withstanding the operating environment to which the bypass plug 340 may be exposed. Furthermore, the bypass plug 340 may have a shape substantially similar to the shape of the corresponding bypass chamber opening 320, thereby allowing for mating. The embodiment of the bypass plug 340 may have a length allowing for a substantially complete blockage of the bypass chamber 310 when the bypass plug 340 is inserted in the bypass chamber opening 320. For example, but not limiting of, in an embodiment of the present invention the bypass plug 340 may comprise a diameter of from about 0.875 inches to about 1.250 inches and a length of from about 1.750 inches to about 2.250 inches.

Referring now to FIG. 5, which is a schematic view, illustrating a bypass plug 340 in accordance with an alternate embodiment of the present invention. As discussed, the bypass plug 340 may be formed of a similar material to the compressor discharge casing 130, or any other material capable of withstanding the operating environment to which the bypass plug 340 may be exposed. Furthermore, the bypass plug 340 may have a shape substantially similar to the shape of the corresponding bypass chamber opening 320, thereby allowing for mating. The embodiment of the bypass plug 340 may have a length allowing for a partial blockage of the bypass chamber 310, when the bypass plug 340 is inserted in the bypass chamber opening 320. For example, but not limiting of, in an embodiment of the present invention the bypass plug 340 may comprise a diameter of from about 0.875 inches to about 1.250 inches and a length of from about 0.750 inches to about 1.250 inches.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A system for regulating a cooling fluid within a turbomachine, the turbomachine comprising a compressor section and at least one wheelspace area, the system comprising:
    a plurality of bypass chambers:
        wherein each of the plurality of bypass chambers allows for the cooling fluid to pass from the compressor section to the at least one wheelspace area; and
        wherein each of the plurality of bypass chambers comprises a bypass chamber opening near the at least one wheelspace area; and
    a plurality of bypass plugs; and
    the compressor section having an inner barrel casing and a compressor discharge casing, wherein each of the plurality of bypass chambers allows for the cooling fluid to pass through the inner barrel casing to the compressor discharge casing and into the at least one wheelspace area; and
        wherein each of the plurality of bypass plugs is insertable into the bypass chamber opening on each of the plurality of bypass chambers; and
        wherein each of the plurality of the bypass plugs is adapted to prevent the cooling fluid from entering the at least one wheelspace area when each of the plurality of bypass plugs is inserted into each bypass chamber opening.

2. The system of claim 1, wherein each of the plurality of bypass chambers further comprises a bypass angular section, wherein the bypass angular section directs the cooling fluid in a manner for pre-swirling the cooling fluid.

3. The system of claim 2, wherein the bypass angular section comprises an angle from about 30 degrees to about 70 degrees.

4. The system of claim 2, wherein the bypass angular section comprises a length of from about 1 inch to about 1.5 inches.

5. The system of claim 1, wherein each of the plurality of bypass chambers comprises a diameter of from about 0.5 inches to about 1 inches.

6. The system of claim 1, wherein the bypass chamber opening comprises a diameter of from about 0.875 inches to about 1.25 inches.

7. The system of claim 1, wherein each of the plurality of bypass plugs comprise a diameter of from about 0.875 inches to about 1.25 inches and a length of from about 1.75 inches to about 2.25 inches.

8. The system of claim 1, wherein each of the plurality of bypass plugs comprise a diameter of from about 0.875 inches to about 1.25 inches and a length of from about 0.75 inches to about 1.25 inches.

9. A system for regulating a cooling fluid within a turbomachine, the turbomachine comprising a compressor section, and at least one wheelspace area, the system comprising:
a plurality of bypass chambers:
wherein each of the plurality of bypass chambers allows for the cooling fluid to pass from the compressor section to the at least one wheelspace area; and
the compressor section having an inner barrel casing and a compressor discharge casing, wherein each of the plurality of bypass chambers allows for the cooling fluid to pass through the inner barrel casing to the compressor discharge casing and into the at least one wheelspace area; and
wherein each of the plurality of bypass chambers comprises a bypass chamber opening near the at least one wheelspace area; and
wherein each of the plurality of bypass chambers further comprises a bypass angular section, wherein the bypass angular section directs the cooling fluid in a manner for pre-swirling the cooling fluid; and
a plurality of bypass plugs:
wherein each of the plurality of bypass plugs is insertable into the bypass chamber opening on each of the plurality of bypass chambers; and
wherein each of the plurality of the bypass plugs is adapted to prevent the cooling fluid from entering the at least one wheelspace area when each of the plurality of bypass plugs is inserted into each bypass chamber opening.

10. The system of claim 9, wherein the bypass angular section comprises an angle from about 30 degrees to about 70.

11. The system of claim 10, wherein the bypass angular section comprises a length of from about 1 inch to about 1.5 inches.

12. The system of claim 9, wherein the bypass chamber opening comprises a diameter of from about 0.875 inches to about 1.25 inches.

13. The system of claim 9, wherein each of the plurality of bypass plugs comprise a diameter of from about 0.875 inches to about 1.25 inches and a length of from about 1.75 inches to about 2.25 inches.

14. The system of claim 9, wherein each of the plurality of bypass plugs comprise a diameter of from about 0.875 inches to about 1.25 inches and a length of from about 0.75 inches to about 1.25 inches.

15. A system integrated with a seal system for regulating a cooling fluid within a turbomachine, the turbomachine comprising a compressor section, and at least one wheelspace area, the system comprising:
a plurality of bypass chambers:
wherein each of the plurality of bypass chambers allows for the cooling fluid to pass from the compressor section to the at least one wheelspace area;
the compressor section having an inner barrel casing and a compressor discharge casing, wherein each of the plurality of bypass chambers allows for the cooling fluid to pass through the inner barrel casing to the compressor discharge casing and into the at least one wheelspace area; and
wherein each of the plurality of bypass chambers comprises a bypass chamber opening near the at least one wheelspace area; and;
wherein each of the plurality of bypass chambers further comprises a bypass angular section, wherein the bypass angular section directs the cooling fluid in a manner for pre-swirling the cooling fluid; and
a plurality of bypass plugs:
wherein each of the plurality of bypass plugs is insertable into the bypass chamber opening on each of the plurality of bypass chambers; and
wherein each of the plurality of the bypass plugs is adapted to block the cooling fluid from entering the at least one wheelspace area when each of the plurality of bypass plugs is inserted into each bypass chamber opening.

16. The system of claim 15, wherein the bypass angular section comprises an angle from about 30 degrees to about 70 degrees.

* * * * *